United States Patent [19]

McDaniel et al.

[11] 4,196,760
[45] Apr. 8, 1980

[54] MATERIAL FEEDING MACHINE

[76] Inventors: Michael A. McDaniel, 1315 Hartford Ave., Bend, Oreg. 97701; James H. Baseman, 6441 N. Montana Ave., Portland, Oreg. 97217

[21] Appl. No.: 883,221

[22] Filed: Mar. 3, 1978

[51] Int. Cl.$^2$ .......................... B27C 1/08; B27C 5/04; B27C 5/06
[52] U.S. Cl. .................................... 144/3 R; 83/402; 83/420; 83/422; 83/732; 144/116; 144/128; 144/134 B; 144/245 A; 144/253 R; 144/253 F; 144/326 R; 198/811; 409/161
[58] Field of Search ................. 144/2 R, 3 R, 114 R, 144/117 R, 117 B, 128, 134 R, 134 B, 137, 242 R, 245 R, 245 A, 309 A, 323, 326 R, 116, 253 R, 253 F; 198/493, 626, 721, 811

[56] References Cited

U.S. PATENT DOCUMENTS

| 478,502 | 7/1892 | Corning | 198/811 |
|---|---|---|---|
| 1,387,873 | 8/1921 | Walker | 144/323 |
| 1,868,707 | 7/1932 | Hothersall | 83/420 |
| 2,732,867 | 1/1956 | May et al. | 144/117 R |
| 3,689,066 | 9/1972 | Hagen | 198/811 |
| 3,783,917 | 1/1974 | Mochizuki | 144/245 A |
| 3,785,416 | 1/1974 | Anthony | 144/245 A |

Primary Examiner—Leonidas Vlachos
Assistant Examiner—W. D. Bray
Attorney, Agent, or Firm—Oliver D. Olson

[57] ABSTRACT

A machine for making wood moldings includes an endless feed belt extending downstream from the upper face cutter head for holding short lengths of wood pieces securely between the working stretch of the feed belt and the underlying bed plate and delivering it through side and lower face cutter heads. An air plenum container overlies and bears against the working stretch of the feed belt to provide uniform feed pressure to the wood throughout the length of the working stretch and delivers air under pressure through a multiplicity of holes in the plenum container to the confronting side of the working stretch of the belt for minimizing friction between the belt and container. Short lengths of wood pieces are delivered in spaced-apart relationship to the upper face cutter head between an elongated side feed belt and an elongated air fence.

10 Claims, 7 Drawing Figures

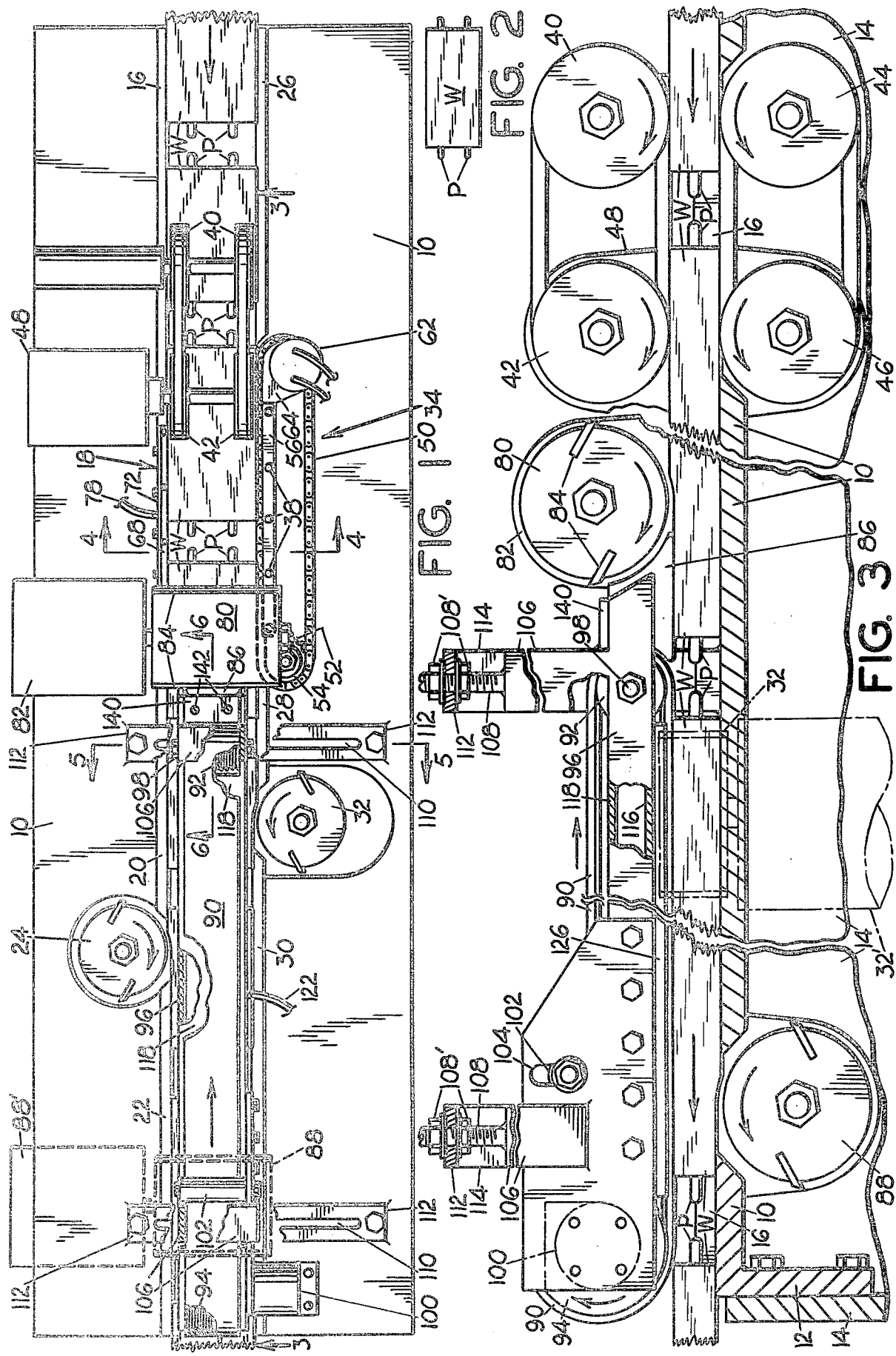

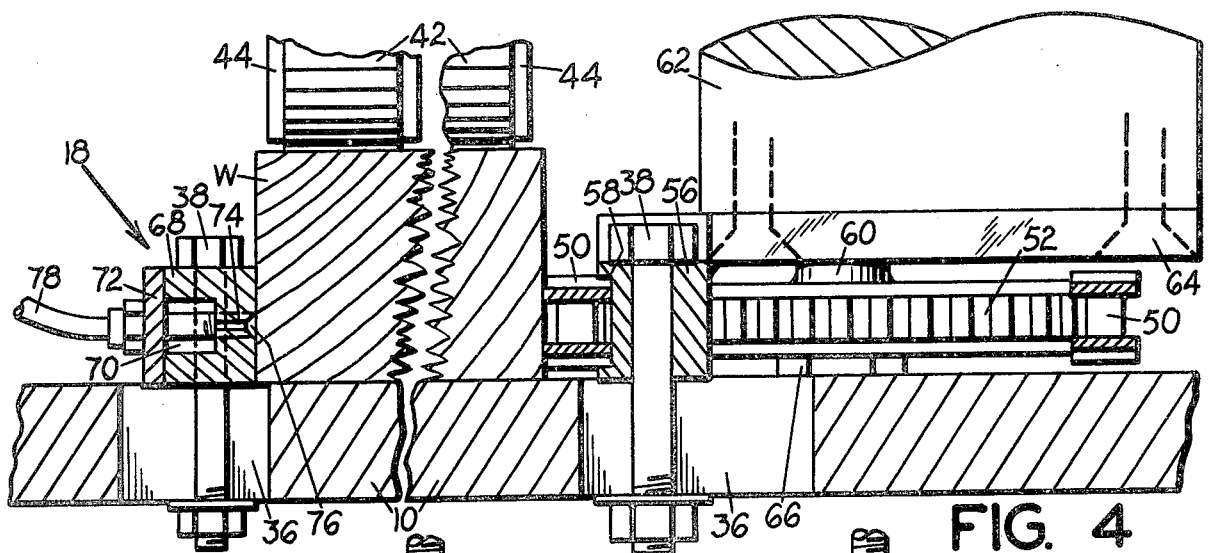
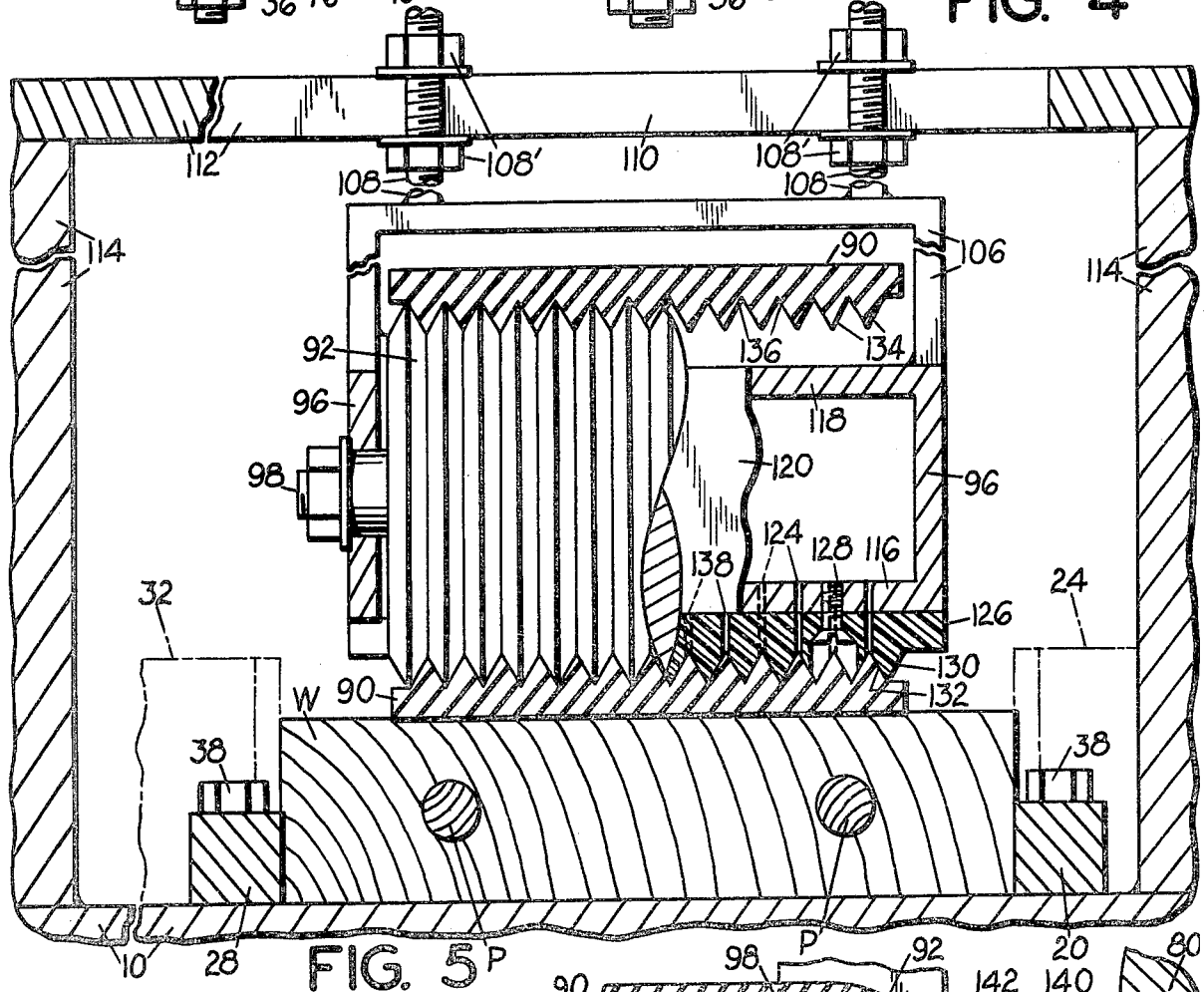
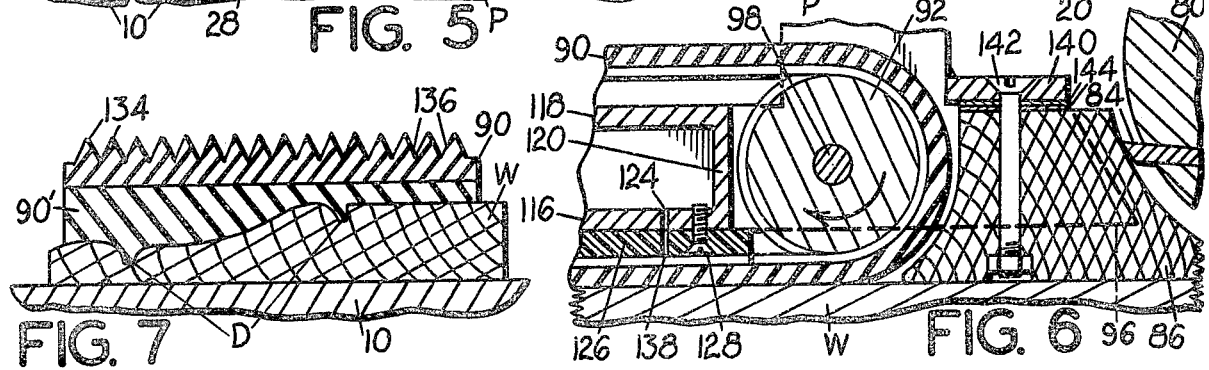

MATERIAL FEEDING MACHINE

BACKGROUND OF THE INVENTION

This invention relates to material feed mechanisms, and more particularly to a machine for making wood moldings, which machine accommodates the feeding of short lengths of wood in spaced-apart relationship.

Machines for making wood moldings heretofore have involved the feeding of wood through the machine by means of longitudinally spaced-apart driven feed rolls. Thus, pieces of wood having length shorter than the distance between adjacent feed rolls necessarily had to be fed through the machine in end-abutting relationship. As a consequence, the ends of the pieces of wood had to be left unfinished until the wood pieces had been processed through the contour-producing cutter heads.

As a specific illustration, there are many objects of manufacture such as panel doors, cabinet drawers and others which require dowel pins, finger joints and other projections on the ends of the molding pieces. It is desirable to provide such ends before finishing the longitudinal surfaces of the molding pieces, in order to insure against tearing or otherwise disfiguring the exposed surfaces of the finished article. Prior molding machines have not accommodated this pre-finishing of the ends.

Further, the outer, finished side of the molding pieces heretofore have had to be produced on the bottom face of the boards as they are fed through the molding machine, in order to minimize shine produced by the pressure contact of the hold down shoe against the upper surface of the wood. This arrangement is satisfactory in the production of moldings having at least two laterally spaced portions of equal maximum thickness, whereby the moldings are maintained in stable, flat condition during transport through the machine. However, the procedure cannot be utilized in the production of moldings which vary in thickness from one side to the other. Accordingly, moldings of the latter type require the finish side to face upward and hence the area in frictional pressure contact with the hold down shoe acquires and undesirable shine.

Still further, the feed of wood pieces by means of live feed rolls heretofore has required the cutter heads to be rotated in the direction opposite the direction of feed, because the lack of absolute control of the wood pieces at all times in the outfeed direction precludes operation of cutter heads in the direction to provide the more precise climb cuts. Accordingly, operation of the cutter heads in the direction opposite the climb cut direction necessarily produces undesirable tear-outs and other disfiguring characteristics on the surfaces of the moldings.

SUMMARY OF THE INVENTION

In its basic concept, this invention provides a material feeding machine in which the elongated working stretch of an endless conveyor is arranged to deliver short lengths of work pieces in spaced-apart relationship past a plurality of longitudinally spaced work processing tools.

It is by virtue of the foregoing basic concept that the principal objective of this invention is achieved; namely, to overcome the aforementioned disadvantages and limitations of prior feeding mechanisms for material working machines.

Another objective of this invention is to provide a material feeding machine in which an elongated air plenum container bears against the elongated working stretch of an endless feed belt to apply uniform feed pressure to work pieces, and air under pressure is delivered from the plenum container to the confronting side of the working stretch of the feedbelt to minimize friction therebetween.

A specific objective of this invention is the provision of a wood molding machine incorporating wood feed mechanism which enables the feeding of short lengths of wood in spaced-apart relationship, thereby enabling prefinishing of the ends of the wood pieces before subjecting the longitudinal surfaces to the cutter heads of the wood molding machine.

Still another objective of this invention is the provision of a wood molding machine which accommodates the feeding of short lengths of wood through cutter heads operated to provide climb cuts.

A further objective of this invention is the provision of a wood molding machine in which a wood hold down shoe is arranged to provide a minimal pressure on wood being processed, whereby to enable the production of the finished side of wood molding on the side facing the hold down shoe, without producing undesirable shine.

A still further objective of this invention is to provide a wood molding machine in which an endless feed belt is provided with an outer surface having the same cross sectional contour as the surface of wood pieces which faces said belt whereby the wood pieces are secured against lateral displacement as they are fed by the belt.

A further objective of this invention is the provision of a material feeding machine of simplified and sturdy construction for economical manufacture and long service life.

The foregoing and other objects and advantages of this invention will appear from the following detailed description, taken in connection with the accompanying drawings of a preferred embodiment.

BRIEF DESCRIPTION OF THE DRAWINGS

FIG. 1 is a fragmentary plan view of a wood molding machine embodying the features of this invention.

FIG. 2 is a plan view of a piece of wood with prefinished ends prior to processing in the wood molding machine of FIG. 1.

FIG. 3 is a fragmentary, foreshortened view in longitudinal section taken on the line 3—3 in FIG. 1.

FIG. 4 is a fragmentary, foreshortened view in transverse section taken on the line 4—4 in FIG. 1.

FIG. 5 is a fragmentary, foreshortened view in transverse section taken on the line 5—5 in FIG. 1.

FIG. 6 is a fragmentary sectional view taken on the line 6—6 in FIG. 1.

FIG. 7 is a transverse, sectional view showing an additional layer to the feed belt for providing the wood-engaging surface of the belt with the same irregular surface as the irregular upper finish side of wood pieces provided by initial operation of the upper cutter head in FIG. 3.

DESCRIPTION OF THE PREFERRED EMBODIMENT

Although the present invention is adaptable for integration into a variety of types of material processing machines, it is illustrated in the drawings, for purposes of the following description, as an integral part of a machine for producing wood moldings.

The components of the machine are supported upon a main frame which includes a horizontal, elongated bed plate 10 provided with a reinforcing peripheral wall 12 and supported at a desired elevation above floor level by means of vertical frame members 14. With reference fo FIG. 1, the right and left hand ends of the bed plate hereinafter are referred to as the infeed and outfeed ends, respectively.

Pieces of wood W are fed from the infeed end of the bed plate to the outfeed end thereof through a guide path provided by laterally spaced fences which extend upwardly from the bed plate and are laterally adjustable to accommodate wood pieces of different widths. As best illustrated in FIG. 1, one of the fences includes a plurality of longitudinally spaced sections 16, 18, 20 and 22, the sections 20 and 22 being spaced apart to accommodate therebetween the motor driven rotary side cutter head 24. The fence section 18 is of special construction as described hereinafter. The opposite fence is also provided as longitudinally spaced sections 26, 28 and 30, the spacing between the sections 28 and 30 accommodating the opposite motor driven (32′) side cutter head. The spacing between the sections 26 and 28 accommodate the side infeed chain assembly 34 described in detail hereinafter.

Lateral adjustment of the fence sections is accommodated by means of laterally elongated slots 36 in the bed plate (FIG. 4) for the reception of releasable clamping bolts 38, as will be apparent.

As illustrated, but forming no part of this invention, pulleys or sprockets 40, 42, and 44, 46 are mounted on the bed plate and support upper and lower feed chains or belts, respectively, arranged for gripping contact with wood pieces to be fed through the machine. The upper pulleys or sprockets are supported above the bed plate in conventional manner (not shown) for vertical adjustment to accommodate wood pieces of varying thickness. The upper and lower belts or chains are driven at the same speed, either by separate synchronous drive motors or thorough conventional, interconnecting sprocket and chain or gear assemblies. For simplicity, FIG. 1 illustrates a separate electric or hydraulic drive motor 48 for the upper and lower assemblies.

The infeed belts or chains allow the pieces of wood to be fed through the machine in longitudinally spaced-apart relationship. By this means, each of the wood pieces to be processed by the molding machine may be pre-finished at their opposite ends.

FIG. 2 illustrates a piece of wood W intended to form a transverse stile of a panel door. For this purpose each of the opposite ends of the piece of wood has been morticed transversely to appropriate contour and has been provided with a pair of laterally spaced holes into which are seated the projecting dowel pins P. As will be understood, these dowel pins are arranged to be inserted in matching holes in the vertical side rails of the panel door.

FIG. 1 shows a plurality of the wood pieces illustrated in FIG. 2, but of different lengths. Thus, transverse door stiles of different lengths may be processed at random through the molding machine for the ultimate assembly of panel doors of different widths.

As previously indicated, pieces of wood intended ultimately to form cabinet drawers also may be processed through the molding machine illustrated in the drawings, after the ends of the pieces have been processed to provide finger joints or other terminal connection members.

From the infeed assembly the pieces of wood are fed forwardly by means of an elongated side infeed conveyor 34. As illustrated in FIGS. 1 and 4 of the drawings, an endless chain 50 is trained about a pair of longitudinally spaced, sprockets 52. One of the sprockets, the left one illustrated in FIG. 1, is an idler sprocket and is mounted upon a base plate 54 which extends outwardly from the longitudinally elongated backing bar 56. This backing bar is provided on its outer side with a longitudinal groove 58 (FIG. 4) dimensioned to freely receive the working stretch of the endless chain 50. As previously explained, a plurality of clamping bolts 38 extend through longitudinally spaced holes in the backing bar and through laterally elongated slots 36 in the bed plate to accommodate lateral adjustment of the side feed conveyor assembly with the fence segments previously described.

The right hand sprocket (FIG. 1) for the side feed chain 50 is mounted on the output rotary shaft 60 of an hydraulic motor 62 (FIG. 4). The motor is attached to the motor base 64 which extends from the right hand end of the backing bar 56. The motor shaft extends through a hole in the base for reception of the sprocket 52. The latter is secured to the motor shaft by means of a nut 66.

It is to be noted from FIG. 4 that lateral adjustment of the backing bar 56, by loosening of the clamp bolts 38, effects simultaneous movement of the entire conveyor assembly 34 of the side feed chain, sprockets and drive motor as an integral unit.

Means is provided for cooperation with the side feed chain for minimizing the frictional contact of the opposite side edge of the wood pieces with the opposing fence 18. In FIGS. 1 and 4 there is illustrated an air fence which is interposed as fence section 18 between the sections 16 and 20. The air fence section comprises an elongated bar 68 of square or rectangular cross section provided with a plurality of longitudinally spaced, vertical openings for the reception of clamp bolts 38. As previously explained, these clamp bolts extend through laterally elongated slots 36 in the bed plate for accommodating lateral adjustment of the fence.

The elongated bar 68 is provided with an internal chamber 70. In the embodiment illustrated, this chamber is formed as a groove in the bar which terminates short of the opposite ends of the bar and is closed at its rearward side by means of a plate 72. A plurality of longitudinally spaced ports 74 extend laterally from the chamber toward the inner fence surface of the bar where they communicate with the longitudinal groove 76 in said face.

A flexible hose 78 is connected at one end to the back plate 72 of the air fence and communicates at said end with the interior chamber 70. The opposite end of the hose is connected to a source (not shown) of air under pressure. Thus, air under pressure is delivered to the chamber which functions as a manifold to deliver the air through the plurality of ports and thence to the longitudinal groove from which it is dispersed uniformly along the adjacent surface of the fence. This layer of air under pressure thus is interposed between the surface of the fence and the confronting surface of the adjacent edge of the wood pieces being fed forwardly by the side feed conveyor 34, to minimize the friction therebetween.

Adjacent the forward, downstream end of the side feed conveyor 34 is located the first face cutter head 80. In the embodiment illustrated, this is the upper cutter head and is mounted above the base plate 10 for vertical adjustment relative to the latter, in conventional manner, to vary the spacing between the cutter head and base plate as required for particular wood pieces. As illustrated, the cutter head is mounted on the output shaft of an electric or hydraulic drive motor 82.

As will be understood, the cutter head 80 is provided with a plurality of knives 84 extending along its axial length and contoured to provide the desired contour in the confronting face surface of the wood pieces to be processed.

It is to be noted, particularly from FIG. 3 of the drawings, that the cutter head 80 is arranged to be driven in the clockwise direction of the arrow, to provide a climb cut in the pieces of wood. This direction of rotation of the cutter head tends to accelerate movement of the wood pieces in the downstream direction, and therefore positive control of the pieces is required in order to resist such accelerated motion. This resistance is provided by the infeed side conveyor 34 previously described and the hold down shoe 86 to be described later. A conventional chip breaker (not shown), similar to hold down shoe 86 preferably is provided immediately adjacent the upstream side of cutter head 80 to hold down the upstream ends of wood pieces as their downstream ends are engaged by the cutter head.

In accordance with a fundamental objective of this invention, means is provided downstream from the first face cutter head 80 for feeding the pieces of wood past additional wood working tools to finish the desired operations on the pieces. In the embodiment illustrated, these additional wood working tools comprise the opposite side cutter heads 24 and 32 (FIG. 1) and the bottom face, motor driven (88') cutter head 88 (FIG. 3) for completing the production of wood moldings from the pieces of wood. An endless feed belt 90 is trained over upstream and downstream drum type pulleys 92 and 94, respectively, which are supported adjacent the opposite ends of a pair of laterally spaced, elongated side plates 96. The upstream roller 92 is an idler roller and is mounted between the plates on the transverse shaft 98. The downstream roller 94 is driven rotationally by an hydraulic motor 100 (FIG. 1). A belt tension roller 102 extends between the plates adjacent the downstream roller and is mounted for vertical adjustment through the slots 104 to vary the tension applied to the return stretch of the endless feedbelt 90, as will be understood.

The belt assembly is mounted for vertical adjustment relative to the bed plate, to accommodate the feeding of wood pieces of varying thickness. As illustrated, a pair of longitudinally spaced U-shaped vertical frames 106 extend upward from the side plates 96 and the upper transverse portion of the frames are connected to a pair of laterally spaced, vertically adjustable hangers. These hangers may be of any desired form, such as vertically extensible hydraulic cylinders. As illustrated, they are provided by a pair of vertically elongated threaded rods 108 which are secured to and extend upwardly from the frames 106 slidably through a laterally elongated slot 110 in the top cross member 112 of a U-shaped supporting frame, the laterally spaced vertical legs 114 of which are secured at their bottom ends to the bed plate 10. Vertical adjustment of the belt assembly is effected by appropriate rotation of the clamp nuts 108', as will be understood.

The laterally elongated slots 110 in each of the U-shaped supporting frames allows the feed belt assembly to be adjusted laterally across the bed plate between defined limits to accommodate wood pieces of varying width.

In accordance with another objective of this invention, the working stretch of the feed belt 90 is backed up structurally throughout substantially its entire working length by means which also minimizes the frictional contact between the working stretch of the belt and said backing support. This is provided, as illustrated, by an elongated closed container which is interposed between the working and return stretches of the belt and between the end pulleys. It includes the bottom working wall 116, top wall 118, longitudinally spaced end walls 120 and laterally spaced side walls. In the embodiment illustrated, the side walls are provided by the side plates 96.

The hollow container forms an air plenum, and for this purpose a flexible air hose 122 communicates at one end with the interior of the container and at the opposite end to a source (not shown) of air under pressure.

The bottom working wall 116 of the container is provided with a multiplicity of holes 124 therethrough for directing air under pressure against the confronting face of the working stretch of the feed belt 90. The holes are dispersed throughout substantially the entire length and width of the bottom working wall of the container so as to provide a substantially continuous layer of air between the confronting surfaces of the wall and belt.

In the preferred embodiment illustrated, the bottom working wall of the air plenum containers is fitted with a backing, or wear plate 126, which is removable and therefore replaceable. For this purpose the plate is secured removably to the bottom wall of the container by means of a plurality of screws 128.

The plate 126 preferably is made of synthetic plastic, although it may be made of wood or other material, as desired. It is provided with a belt-engaging surface which is serrated in transverse cross section to provide a plurality of laterally spaced ridges 130 separated by valleys 132. Correspondingly, the confronting surface of the feed belt 90 is similarly serrated in cross section to provide ridges 134 and valleys 136 mating with the valleys 132 and ridges 130 in the plate. The end pulleys 92 and 94 which support the belt also are similarly serrated, in the manner illustrated in FIG. 5, to accommodate the serrated configuration of the belt.

The serrated construction of the belt, pulleys and backing plate insures against lateral displacement of the working stretch of the belt relative to the confronting bed plate and the interposed wood pieces, and thereby insures maximum precision of the mold forming operations.

The backing plate 126 also is provided with a multiplicity of openings 138 in the bottom working wall 116 of the air plenum container, as illustrated in FIG. 5. The holes in the backing plate are shown to communicate with the inner ends of the valleys 132, although the position is not critical to the performance of the system. In this respect, air under pressure within the plenum is delivered through the registering holes to the confronting surfaces of the backing plate 126 and working stretch of the feed belt 90. The pressure is sufficient to move the working stretch of the feed belt slightly away from the backing plate to form a substantially continuous layer of air therebetween.

The layer of air between the working stretch of the feed belt and the backing plate performs the two-fold function of minimizing the frictional contact between the confronting surfaces of the plate and belt, and of moving the working stretch of the belt a slight distance toward the bed plate to provide a slightly increased contact pressure against the wood pieces interposed between the working stretch of the belt and the bed plate. Thus, the air plenum container provides substantially uniform backing support for the working stretch of the feed belt, and hence substantially uniform contact with the pieces of wood being fed through the machine, while the layer of air minimizes the frictional contact between the backing support and working stretch and contributes a slightly additional contact pressure of the working stretch against the wood pieces.

As previously mentioned, the hold down shoe is supported between the upstream end of the feed belt 90 and the first face cutter head 80. In the preferred embodiment illustrated, the side plates 96 which support the feed belt assembly are extended in the upstream direction from the infeed end of the fed belt and the hold down shoe is supported between them. As illustrated, a plate 140 is welded across the upper sides of the plate extensions and bolts 142 are extended downward therethrough and through registering openings in the hold down shoe for securing the latter in position.

Vertical adjustment of the hold down shoe is accommodated by interposing one or more shims 144 between the upper side of the shoe and the confronting underside of the transverse plate. In this regard, the hold down shoe is adjusted so that its surface facing the bed plate is adjusted relative thereto so as to apply only slight pressure against the confronting, finished surface of the wood pieces as they proceed downstream from the first face cutter head 80. In this manner the wood pieces are held in place during operation of the cutter head without the application of excessive pressure which otherwise produces unattractive shine on the surface of the wood pieces. Additional pressure then is applied to the wood pieces by the elongated feed belt 90 to hold the pieces positively during operation of the side cutter heads 24, 32 and final face cutter head 88. Since there is no relative sliding movement between the feed belt and wood pieces, the additional holding pressure does not produce shine.

As previously mentioned, all of the cutter heads are adjustable to accommodate wood pieces of varying thickness and width. Since support structures for such cutter head adjustments are well known to those skilled in the art, they are not described herein.

The operation of the molding machine described hereinbefore is as follows: Pieces of wood W which have been prefinished at their opposite ends, as desired, are fed one at a time between the infeed sections 16 and 26 of the two adjusted fences into contact with the infeed belts or chains which deliver the pieces of wood in the downstream direction to the infeed end of the side feed conveyor 34 and air fence assembly 18. The layer of air between the confronting surfaces of the air fence and the side edge of the wood pieces minimizes the frictional contact therebetween, while the pressure contact of the side feed chain 50 against the opposite side edge of the wood pieces enables the side feed chain to deliver the wood pieces downstream under the chip breaker and into working engagement with the upper cutter head 80. The cutter head is rotated in the direction to provide a climb cut, which produces the most precise and smoothest finished surface on the wood pieces. The latter progress downstream under the hold down shoe 86 which provides sufficient pressure to prevent vertical chattering of the wood pieces, without producing shine on the confronting finished surface.

The wood pieces proceed downstream into pressure contact with the infeed end of the main feed conveyor belt 90. This conveyor maintains pressure contact with each wood piece as the latter passes through the operating stations of the opposite side cutter heads 32, 24 and the bottom cutter head 88, which are rotated to produce climb cuts, whereby to insure maximum precision of operation of the cutter heads and the production of high quality wood molding products. Air under pressure from the plenum passes through the registering holes 124 and 138 in the bottom working wall 116 of the plenum container and the backing plate 126, to provide a layer of air between the backing plate and working stretch of the feed conveyor belt. This layer of air minimizes the frictional engagement between the backing plate and the belt, thereby extending the useful life of both. The layer of air also urges the working stretch of the feed belt into slightly greater pressure contact with the wood pieces being fed through the machine.

The final mold forming operation is performed by the bottom cutter head 88 before the wood pieces are released from the confining pressure of the endless feed belt 90. By this means all of the cutter heads 24, 32 and 88 are allowed to be rotated in the direction to provide climb cuts, since the wood pieces are held firmly in place during operation of the cutter heads.

In accordance with this invention, means also may be provided by which the feed belt 90 is rendered capable of making substantially complete pressure contact with the confronting, finished surface of wood pieces delivered from the initial cutter head 80. Referring to FIG. 7 of the drawings, there is illustrated a piece of wood resting with its flat, unfinished underside on the bed plate 10, and having its upper side contoured to finished form by the initial cutter head 80. It is to be noted that the flat, confronting surface of the working stretch of the feed belt 90 would be capable of making pressure contact with only a small portion of the upper surface of the wood pieces. Such minimum pressure contact may be insufficient to prevent lateral displacement of the wood piece as it progresses in the downfeed direction past the side cutter heads 32 and 24 and the final cutter head 88.

In accordance with this invention, the feed belt 90 is provided with an outer surface which is contoured and aligned to mate with the finished contour of the confronting surface of the wood pieces as they are delivered from the initial cutter head 80. This contoured outer surface of the belt may be formed on the outer surface of the belt itself, if the cost can be justified. In the preferred embodiment illustrated, it is provided by a second endless belt 90' placed over the outer surface of the belt 90. The second belt 90' may be bonded to the belt 90, either permanently or removably as by a pressure sensitive adhesive. It is preferred that the second belt 90' merely be stretched over the belt 90 and retained in position by the mutual frictional contact between the belts.

FIG. 7 illustrates a wood piece molding contour which includes one or more longitudinal depressions D. The mating contour of the second belt 90' thus provides an effective interengagement of the belt and wood piece, whereby positively to prevent lateral displacement of the wood piece relative to the feed belt assembly.

For use with the second belt 90' in FIG. 7, the corresponding bottom surface of the hold down shoe 86 also may be contoured to the same configuration and adjusted to align longitudinally with the contour of the belt 90' and the cutter head 80.

Although the feed mechanism of this invention is described hereinbefore in association with a wood molding machine, it will be appreciated that it may be utilized with a variety of other types of machines, such as those for cutting or otherwise processing metal, synthetic plastics and other materials.

It will be apparent to those skilled in the art that various changes may be made in the size, shape, type, number and arrangement of parts described hereinbefore without departing from the spirig of this invention.

We claim:

1. In a materials processing machine having a frame and a material-supporting base on the frame, an infeed conveyor comprising:
   (a) an elongated endless infeed conveyor mounted on the frame and having a working stretch disposed adjacent one side of the base for engaging one longitudinal side of pieces of material to be worked,
   (b) an elongated hollow infeed fence mounted on the frame adjacent the opposite side of the base and having a fence wall facing the working stretch of the infeed conveyor,
   (c) a plurality of longitudinally spaced openings through said fence wall, and
   (d) means for communicating the interior of the hollow fence with a source of air under pressure.

2. The infeed conveyor of claim 1 including an elongated groove in said fence wall communicating with said plurality of longitudinally spaced openings.

3. A materials processing machine, comprising:
   (a) a frame,
   (b) a material supporting base on the frame,
   (c) an elongated endless feed belt mounted on the frame and having a working stretch confronting and spaced from the base for receiving pieces of material therebetween,
   (d) an elongated backing member mounted on the frame and having a rigid working surface engaging the working stretch of the feed belt on the side opposite the base,
   (e) a material processing tool mounted on the frame for processing pieces of material held between the base and working stretch of the feed belt, and
   (d) a cutter head mounted on the frame adjacent the infeed end of the feed belt for cutting the surface of material facing the working stretch of the belt to provide a predetermined irregular cross sectional contour, the outer surface of the feed belt being contoured in cross section to match said irregular cross sectional contour.

4. The machine of claim 3 wherein the feed belt includes an inner layer and an outer layer having said outer contoured surface.

5. A materials processing machine, comprising:
   (a) a frame,
   (b) a material supporting base on the frame,
   (c) an elongated endless feed belt mounted on the frame and having a working stretch confronting and spaced from the base for receiving pieces of material therebetween,
   (d) an elongated backing member mounted on the frame and having a working surface engaging the working stretch of the feed belt on the side opposite the base,
   (e) a material processing tool mounted on the frame for processing pieces of material held between the base and working stretch of the feed belt, and
   (f) a hold down member mounted on the backing member and disposed upstream and adjacent the infeed end of the feed belt, the hold down member having a material-engaging surface arranged to apply less hold down pressure against material being processed than the material- engaging surface of the working stretch of the feed belt.

6. A materials processing machine, comprising:
   (a) a frame,
   (b) a material supporting base on the frame,
   (c) an elongated endless feed belt mounted on the frame and having a working stretch confronting and spaced from the base for receiving pieces of material therebetween,
   (d) an elongated backing member mounted on the frame and having a working surface engaging the working stretch of the feed belt on the side opposite the base,
   (e) a material processing tool mounted on the frame for processing pieces of material held between the base and working stretch of the feed belt,
   (f) an elongated endless infeed conveyor mounted on the frame upstream from the endless conveyor belt and having a working stretch disposed adjacent one side of the base for engaging one longitudinal side of pieces of material to be processed,
   (g) an elongated hollow infeed fence mounted on the frame adjacent the opposite side of the base and having a wall facing the working stretch of the infeed conveyor,
   (h) an elongated groove in said fence wall,
   (i) a plurality of openings through said fence wall communicating the groove with the interior of the hollow fence, and
   (j) means for communicating the interior of the hollow fence with a source of air under pressure.

7. A materials processing machine, comprising:
   (a) a frame,
   (b) a material supporting base on the frame,
   (c) an elongated endless feed belt mounted on the frame and having a working stretch confronting and spaced from the base for receiving pieces of material therebetween,
   (d) an elongated backing member mounted on the frame and having a rigid working surface engaging the working stretch of the feed belt on the side opposite the base,
   (e) a material processing tool mounted on the frame for processing pieces of material held between the base and working stretch of the feed belt,
   (f) an elongated, hollow plenum container mounted on the frame and having a rigid working wall engaging the working stretch of the feed belt on the side opposite the base, and
   (g) means for communicating the interior of the hollow container with a source of air under superatmospheric pressure,
   (h) the working wall of the container having therethrough a multiplicity of openings distributed over substantially its entire belt-engaging surface for delivering air under superatmospheric pressure from the container to the confronting side of the working stretch of the feed belt for minimizing friction between said working wall and working stretch, and (i) a hold down member mounted on the plenum container and disposed upstream and adjacent the infeed end of the feed belt, the hold down member having a material-engaging surface arranged to apply less hold down pressure against material being processed than the material-engaging surface of the working stretch of the feed belt when air under pressure is applied from the plenum container to the working stretch of the feed belt.

8. A materials processing machine, comprising:
(a) a frame,
(b) a material supporting base on the frame,
(c) an elongated endless feed belt mounted on the frame and having a working stretch confronting and spaced from the base for receiving pieces of material therebetween,
(d) an elongated backing member mounted on the frame and having a rigid working surface engaging the working stretch of the feed belt on the side opposite the base,
(e) a material processing tool mounted on the frame for processing pieces of material held between the base and working stretch of the feed belt,
(f) an elongated, hollow plenum container mounted on the frame and having a rigid working wall engaging the working stretch of the feed belt on the side opposite the base, and
(g) means for communicating the interior of the hollow container with a source of air under superatmospheric pressure,
(h) the working wall of the container having therethrough a multiplicity of openings distributed over substantially its entire belt-engaging surface for delivering air under superatmospheric pressure from the container to the confronting side of the working stretch of the feed belt for minimizing friction between said working wall and working stretch, the working wall of the plenum container including a plate secured removably to the corresponding wall of the container, the plate having therethrough a multiplicity of openings registering with the openings through said corresponding wall of the container.

9. The machine of claim 8 wherein:
(a) a cutter head is mounted on the frame adjacent the infeed end of the feed belt for cutting the surface of material facing the working stretch of the belt to provide a predetermined irregular cross sectional contour,
(b) the feed belt comprises inner and outer layers, the outer layer being contoured in cross section to match said irregular cross sectional contour, and
(c) a hold down member is mounted on the plenum container and is disposed between the in feed end of the feed belt and the cutter head, the hold down member having a material-engaging surface contoured in cross section to match said predetermined irregular cross sectional contour.

10. The machine of claim 8 wherein:
(a) a cutter head is mounted on the frame adjacent the infeed end of the feed belt for cutting the surface of material facing the working stretch of the belt to provide a predetermined irregular cross sectional contour,
(b) the feed belt comprises inner and outer layers, the outer layer being contoured in cross section to match said irregular cross sectional contour, and including
(c) an elongated, endless infeed conveyor mounted on the frame upstream from the first cutter head and having a working stretch disposed adjacent one side of the base for engaging one longitudinal side of pieces of material to be worked,
(d) an elongated hollow infeed fence mounted on the frame adjacent the opposite side of the base and having a wall facing the working stretch of the infeed conveyor,
(e) an elongated groove in said fence wall,
(f) a plurality of openings through said fence wall communicating the groove with the interior of the hollow fence, and
(g) means for communicating the interior of the hollow fence with a source of air under pressure.

* * * * *